US007007044B1

(12) United States Patent
Rafert et al.

(10) Patent No.: US 7,007,044 B1
(45) Date of Patent: Feb. 28, 2006

(54) STORAGE BACKUP SYSTEM FOR BACKING UP DATA WRITTEN TO A PRIMARY STORAGE DEVICE TO MULTIPLE VIRTUAL MIRRORS USING A RECONCILIATION PROCESS THAT REFLECTS THE CHANGING STATE OF THE PRIMARY STORAGE DEVICE OVER TIME

(75) Inventors: James Lee Rafert, Westminster, CO (US); Marcia R. Martin, Erie, CO (US); Michael Paul Abramovitz, Thornton, CO (US)

(73) Assignee: Storage Technology Corporation, Louisville, CO (US)

( * ) Notice: Subject to any disclaimer, the term of this patent is extended or adjusted under 35 U.S.C. 154(b) by 451 days.

(21) Appl. No.: 10/330,968

(22) Filed: Dec. 26, 2002

(51) Int. Cl.
*G06F 12/16* (2006.01)

(52) U.S. Cl. ............... 707/203; 711/156; 711/161; 711/162; 707/203; 707/204; 714/1; 714/2; 714/6

(58) Field of Classification Search ............... 707/200, 707/201, 202, 203, 204, 205; 714/1, 2, 5, 714/6, 7, 8, 13, 20; 711/161, 162, 156, 147
See application file for complete search history.

(56) References Cited

U.S. PATENT DOCUMENTS

| 5,495,587 | A | * | 2/1996 | Comfort et al. | ............ 712/228 |
| 5,500,806 | A | * | 3/1996 | Bellin et al. | ................ 700/298 |
| 5,668,991 | A | * | 9/1997 | Dunn et al. | ................. 707/202 |
| 5,724,581 | A | * | 3/1998 | Kozakura | ................... 707/202 |
| 5,974,429 | A | * | 10/1999 | Strub et al. | .................. 707/203 |
| 6,047,294 | A | * | 4/2000 | Deshayes et al. | ........... 707/204 |
| 6,490,598 | B1 | * | 12/2002 | Taylor | ........................ 707/204 |
| 6,578,120 | B1 | | 6/2003 | Stanley et al. | ............. 711/163 |
| 6,662,198 | B1 | * | 12/2003 | Satyanarayanan et al. | .. 707/204 |
| 6,691,245 | B1 | * | 2/2004 | DeKoning | ..................... 714/6 |
| 6,732,125 | B1 | * | 5/2004 | Autrey et al. | .............. 707/204 |
| 6,738,757 | B1 | * | 5/2004 | Wynne et al. | ................. 707/3 |
| 6,799,189 | B1 | * | 9/2004 | Huxoll | ....................... 707/204 |
| 6,839,819 | B1 | * | 1/2005 | Martin | ....................... 711/162 |
| 2003/0084242 | A1 | | 5/2003 | Strange et al. | ............. 711/114 |
| 2003/0131253 | A1 | * | 7/2003 | Martin et al. | ............... 713/200 |
| 2004/0107226 | A1 | * | 6/2004 | Autrey et al. | .............. 707/204 |
| 2004/0143639 | A1 | | 7/2004 | Rangan et al. | ............. 709/212 |

OTHER PUBLICATIONS

"Schedule Program Diskette File Structure". IBM Technical Disclosure Bulletin, Jan. 1, 1987, vol. 29, issue 8, pp. 3508-3511.*

\* cited by examiner

*Primary Examiner*—B. James Peikari
(74) *Attorney, Agent, or Firm*—Yee & Associates, P.C.

(57) ABSTRACT

The present invention is directed toward the resumption of a journaling process in a data management appliance after a period of unavailability. The data management appliance is a random-access storage system that at the logical block level replicates the contents of a primary storage system over time. A small "dirty extent map" is established on the primary storage device. The dirty extent map keeps track of which portions of primary storage are written to while journaling is interrupted. When journaling is resumed, the contents of the dirty extents are compared to the latest replica of the primary storage to identify the differences. These differences are then journaled as if they were write commands. Meanwhile, new write commands are also journaled by the data management appliance. Once the differences of all of the dirty extents have been journaled, the data management appliance may resume normal journaling operation.

34 Claims, 5 Drawing Sheets

STORAGE BACKUP SYSTEM FOR BACKING UP DATA WRITTEN TO A PRIMARY STORAGE DEVICE TO MULTIPLE VIRTUAL MIRRORS USING A RECONCILIATION PROCESS THAT REFLECTS THE CHANGING STATE OF THE PRIMARY STORAGE DEVICE OVER TIME

CROSS REFERENCE TO RELATED APPLICATIONS

The present invention is related to the following application entitled "DATA FUNNEL," Ser. No. 10/330,825, filed even date hereof, assigned to the same assignee, and incorporated herein by reference.

BACKGROUND OF THE INVENTION

1. Field of the Invention

The present invention is directed generally toward data storage and backup systems. More specifically, the present invention is directed toward a backup system that immediately backs up data written to a primary storage device to multiple "virtual mirrors," that reflect the changing state of the primary storage device over time.

2. Background of the Invention

A data replication system can provide an up-to-the-minute duplicate copy or replica of changing data on a storage device. Write commands issued to a primary storage device are duplicated and issued to the data replication system, which records the written data in its own storage medium. The simplest form of data replication is a redundant "mirror" volume, which is sophisticated data replication systems store not only a current duplicate copy of the primary device but also allow additional past-time images of the primary device to be accessed. This may be done through some kind of "journaling," where the write commands themselves are archived, rather than simply a copy of the data.

Sometimes, however, communication to the data replication system is lost. This may be for a variety of reasons. For example, a physical connection with the device hosting the data replication system may be broken, or communication software may malfunction. When this happens, a data replication system will be out of synchronization with the primary storage device. Some reconciliation process is necessary to restore synchronization between the data replication system and the primary storage device.

Performing this reconciliation well is not a trivial task. One easy way to reconcile a primary storage device with its data replication system is simply to temporarily take the primary storage device out of service and copy the contents of the primary storage device to the data replication system. It is an undesirable technique, as it requires taking the primary storage out of service.

Another way to reconcile the two storage systems is to temporarily (while the data replication system is unavailable) store the duplicated write commands in an auxiliary journal, then "replay" the write commands for the data replication system when it comes back up. This is also undesirable, since it requires extra storage for the auxiliary journal.

What is needed, then, is a mechanism for the resumption of data replication that is minimally intrusive and that requires a minimal amount of extra storage space.

SUMMARY OF THE INVENTION

The present invention is directed toward the resumption of a journaling process in a data management appliance after a period of unavailability. The data management appliance is a random-access storage system that at the logical block level replicates the contents of a primary storage system over time. Journaling is a process of recording write commands originally issued to the primary storage system in the data management appliance so that the data management appliance reflects the most current updates to the primary storage system.

A small "dirty extent map" is established on the primary storage device, representing the primary storage system as a number of large blocks (extents) of data. If data is written to the primary storage system while the data management appliance is unavailable, the dirty extent map is updated to indicate that one or more of the extents was written to and is now, as a result, "dirty."

When the data management appliance becomes available again, the contents of the dirty extents are reproduced and compared to the latest replica of the primary storage system provided by the data management appliance to identify the differences. These differences are then journaled by the data management appliance as if they were write commands. Meanwhile, new write commands are also journaled by the data management appliance. Once the differences of all of the dirty extents have been journaled, the data management appliance is fully reconciled and may resume normal journaling operation.

To ensure that the transition between journal resumption and journaling states is smooth and instantaneous, a data funnel is used to switch the flow of data between a reconciliation process for restoring the data management appliance's consistency and a forward journal for receiving write commands in the normal course of journaling. The data funnel takes two inputs, one from a host computer or primary storage (for receiving dirty extents and write commands) and another from the reconciliation process (for receiving computed differences). In response to signals received through the two inputs, the data funnel acts as a switch that takes the reconciliation process instantaneously in and out of the data flow.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention is directed toward a method, computer program product, and apparatus for resuming a journaling process in a device that archives data through journaling. Such a device, for the purposes of the present application is known as a data management appliance. One such data management appliance is described in Commonly assigned, co-pending U.S. patent application Ser. No. 10/034,305, entitled "DATA MANAGEMENT APPLIANCE," filed Dec. 28, 2001, which is hereby incorporated by reference. At a minimum, a data management appliance must perform two functions: First, a data management captures write commands changing the contents of a primary storage device and journals the changes on a secondary storage device associated with the data management appliance. Second, a data management appliance must be capable of computing "virtual view" representations or "replicas" of the contents of the primary storage device at particular times in the past. A "virtual view" maps logical addresses on the primary storage device into the contents of those addresses at a given time in the past. One of ordinary skill in the art will appreciate that the data management appliance need not be capable of computing a "virtual view" for every time in the past. Preferably, a data management appliance will be capable of producing virtual views with finer time-granularity for recent times (i.e., more virtual views will be available for recent times than times further in the past), but this is not a requirement either.

Figure 1:
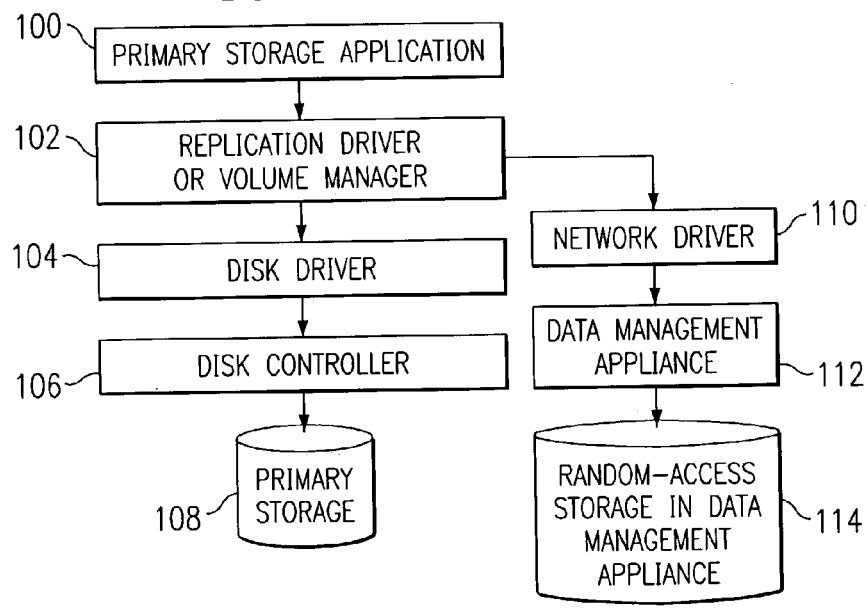
FIG. 1 is an overall view of the operation of a data management appliance in accordance with a preferred embodiment of the present invention.

FIG. 1 is a diagram providing an overall view of the normal operation of a data management appliance in accordance with a preferred embodiment of the present invention. A primary storage application 100, residing on a host computer system, submits a command to a forked write driver 102 to store data to primary storage 108. Forked write driver 102 relays the request both to disk driver 104 and network driver 110. Disk driver 104 is device driver code that operates disk controller 106, which in turn controls primary storage 108, which is in this case a disk drive, although many different alternative random-access storage devices could be used in place of primary storage 108.

Network driver 110 is device driver code that controls access to a computer network. Network driver 110 relays the submitted storage command to data management appliance 112, which is located on a network associated with the host computer system. Data management appliance 112 is an intelligent peripheral device that presents the appearance on the network of a disk array or arrays or other random-access storage medium. Data management appliance 112 contains control circuitry and also contains its own random-access storage 114. The control circuitry may be, for instance, an embedded stored-program computer, such as a microprocessor and memory or a microcontroller. The stored program may be stored in firmware or loaded from a storage medium, such as floppy disk. Data management appliance 112, through control circuitry, uses random-access storage 114 to replicate the information stored on primary storage 108. As will be seen, data management appliance 112 not only provides a replica of the current contents of primary storage 108, but it also contains information that it can use to reconstruct replicas of previous contents of primary storage 108 at various points in time.

Figure 2:
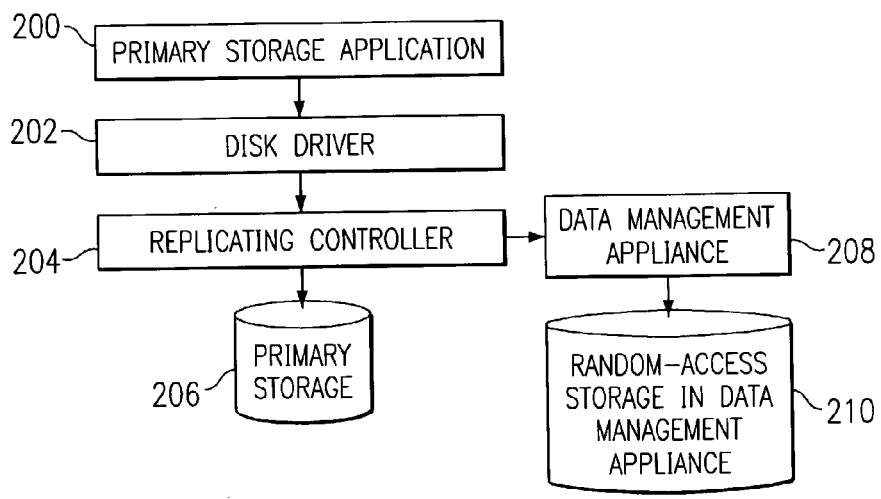
FIG. 2 is an overall view of the operation of an alternative embodiment of the present invention in which commands are replicated using a replicating controller.

FIG. 2 is a diagram of an alternative embodiment of the present invention, in which the replication driver is replaced with replicating hardware. Primary storage application 200 issues a write command to disk driver 202, which is device driver code. Disk driver 202 controls replicating controller 204, which is a hardware disk controller that controls primary storage 206, but which has the additional feature of replicating storage commands submitted to primary storage 206 and providing the replicated commands to data management appliance 208, which replicates the data contained on primary storage 206 on random-access storage 210.

Figure 3:
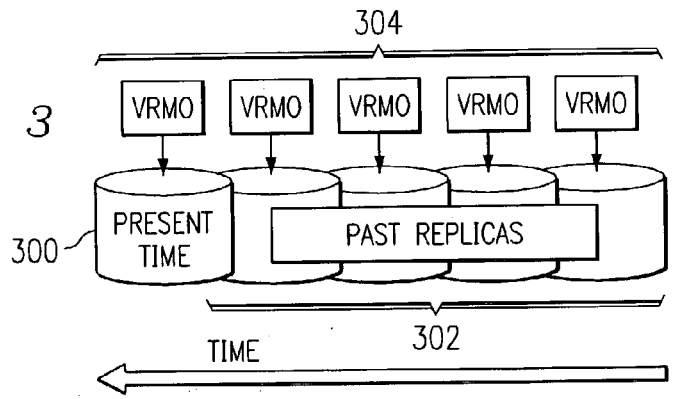
FIG. 3 is a diagram providing a conceptual view of the replicated storage provided by a data management appliance in accordance with a preferred embodiment of the present invention.

FIG. 3 is a diagram providing a conceptual view of the replicated storage provided by data management appliance 112 (or 208). Data management appliance 112 is programmed to behave as though it stores a number of duplicate copies (called replicas or virtual views) of primary storage device 108 as it existed at certain points in time (replicas 300, 302). Data management appliance 112 can provide a near-time (i.e., near the present time) replica (300) of primary storage device 108 or any one of a number of virtual views or mirrors of earlier versions of the data stored on primary storage device 108. Each of these virtual mirrors is accessed using one of a number of virtual recovery mapping objects (VRMOs) 304, which each represent a different point in time.

Data may be read from data management appliance 112 by either specifying that data management appliance 112 behave (for reading purposes) as a copy of primary storage device 108 at a specified time (e.g., during the mounting process), or by specifying read commands that contain an additional time field. For example, to retrieve the contents of block 5 at some time "t," either data management appliance 112 could be directed to behave as if it were time "t," in which case any read command to any block would result in the data that was present at time "t," or a read command that simply stated "retrieve block 5 from time 't'" could be issued instead.

A number of schemes are available for providing replicated storage in a data management appliance in accordance with the present invention. Commonly assigned, co-pending U.S. patent application Ser. No. 10/034,305, entitled "DATA MANAGEMENT APPLIANCE," filed Dec. 28, 2001, which is hereby incorporated by reference, describes a data management appliance using a "Mirror-in-the-Middle" replication scheme. A mirror-in-the-middle (MIM) included in the data management appliance is used to record an exact copy of the primary storage system at some fixed point in time.

Atomic write events in the "Mirror-in-the-Middle" scheme are recorded in a "forward journal" by the appliance immediately, so that applications are not interrupted. An atomic event or transaction is one that cannot be divided into parts; an atomic event or transaction is either performed in its entirety or not performed at all. At specified points in time, forward journal entries are used to produce snapshots, reflecting the change in the primary storage system over a period of time. These snapshots are recorded in a "backward journal" and represent a coarser level of backup granularity, much like an incremental backup. As snapshots are produced, the forward journal entries are applied to the MIM to update its contents and finally discarded to save space.

Another data replication scheme, "Intrinsic Data Protection," is described in U.S. Pat. No. 6,732,125, Ser. No. 09/657,291, filed Sep. 8, 2000, entitled "SELF ARCHIVING LOG STRUCTURED VOLUME/INTRINSIC DATA PROTECTION," which is hereby incorporated by reference. Intrinsic Data Protection makes use of a "self-archiving log-structured volume," which records the results of every write event in a new location in primary storage, forming a chronological log of the state changes the volume undergoes. The self-archiving log-structured volume records in the log the points in time (synch events) when the blocks of the self-archiving log-structured volume are in a consistent state with respect to the structured storage application that owns the primary storage. A structured storage application is an software layer such as a file system, data base, or other data organization software that presents information stored on a block device in a manner meaningful to end users. Inactive segments of the log may be migrated to a backing store, and a replica may be reconstructed from a fixed number of log segments.

Figure 4A:
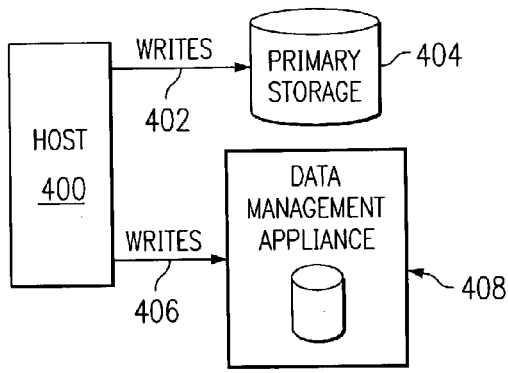
FIGS. 4A–4C depict an overall process of journal resumption in accordance with a preferred embodiment of the present invention.
Figure 4B:
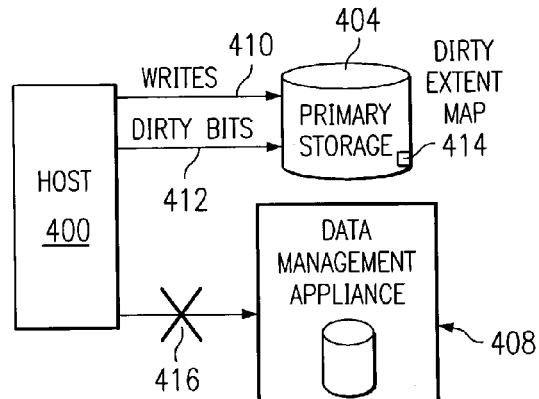
Figure 4C:
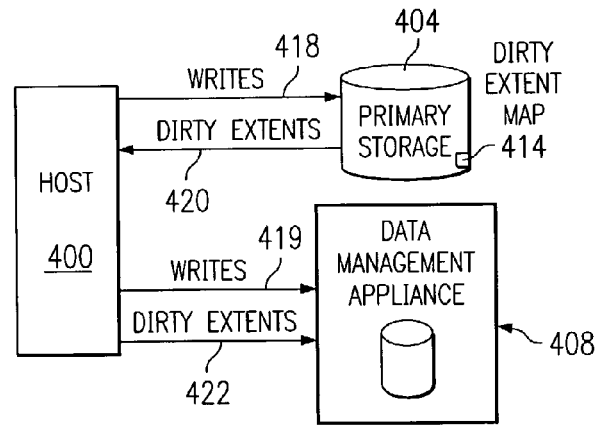

FIGS. 4A–4C depict an overall process of journal resumption in accordance with a preferred embodiment of the present invention. FIG. 4A shows the normal process of journaling before communication is lost. Host 400 issues write commands 402 to primary storage 404. Each of write commands 402 is an instruction to write a block of data to a particular address range on primary storage 404. Each of write commands 402 is duplicated as write commands 406 and submitted to data management appliance 408. In this way, data management appliance 408 keeps a record of the contents of primary storage 404 as they evolve over time.

FIG. 4B shows what happens when communication between host 400 and data management appliance 408 is lost (416). Host 400 continues to issue write commands 410 to primary storage 404. Because contact with data management appliance 408 has been lost, however, write commands 410 are not duplicated and sent to data management appliance 408. Instead, host 400 writes dirty bits 412 to a dirty extent map 414 located on primary storage 404. Dirty extent map 414 is, in a preferred embodiment, a bit map, with each bit in the bit map representing a particular address range on primary storage 404. As host 400 issues write commands 410 to write data to particular address ranges on primary storage 404, host 400 writes dirty bits 412 to dirty extent map 414 to represent those address ranges on primary storage 404 that have been effected by write commands 410. In a preferred embodiment, dirty extent map 414 is relatively small compared to the storage capacity of primary storage 404, perhaps taking up only a few kilobytes.

FIG. 4C depicts a process of restoring the journaling process after communication between host 400 and data management appliance 408 is restored. As before, write commands 418 are issued by host 400 to primary storage 404. Now, however, because data management appliance 408 is accessible, write commands 419, which are duplicates of write commands 418, are sent to data management appliance 408. Meanwhile, host 400 scans dirty extent map 414 to identify which address ranges on primary storage 404 have been effected by write commands during the time in which communication was lost between host 400 and data management appliance 408. These address ranges are known as dirty extents. Host 400 reads dirty extents 420 from primary storage 404 according to dirty extent map 414. Host 400 then relays the dirty extents (422) to data management appliance 408 in order to update data management appliance 408 to a point at which normal journaling according to FIG. 4A can be resumed. In a preferred embodiment, dirty extents 422 are transmitted as a form of write command that writes the contents of the entire extent; in this way, dirty extents 422 may be treated in an identical manner to write commands 418. One of ordinary skill in the art will recognize that although FIG. 4C depicts host 400 relaying the dirty extents from primary storage 404 to data management appliance 408, in an actual embodiment the dirty extents may be transferred directly from primary storage 404 to data management appliance 408. Such a direct transfer would be particularly feasible where primary storage 404 and data management appliance 408 are located on a storage area network. After all of the dirty extents have been relayed to data management appliance 408, normal journaling can resume as shown in FIG. 4A.

One of ordinary skill in the art will recognize that at least from the perspective of host 400, FIGS. 4A–4C depict a three state journaling resumption scheme. FIG. 4A depicts the normal state in which write commands are issued to the primary storage then duplicated and sent to the data management appliance. FIG. 4B depicts a second state in which a dirty extent map is created in response to a loss of communication between the host and data management appliance. Finally, FIG. 4C is yet another state in which data management appliance 408 is brought up to date with current write commands and dirty extents. One of ordinary skill in the art will recognize that the correct state may be maintained by storing an identification of the state in a state variable, as is well-known in the art.

Figure 5:
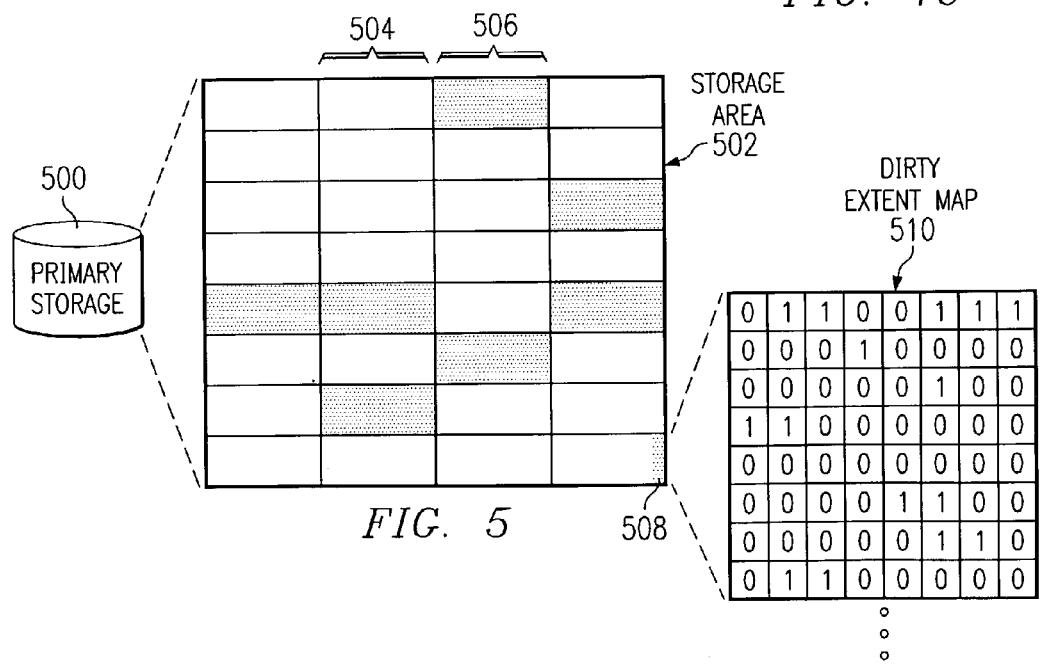
FIG. 5 is a diagram providing a conceptual depiction of a primary storage device and associated dirty extent map in accordance with a preferred embodiment of the present invention.

FIG. 5 is a diagram providing a conceptual depiction of a primary storage device and associated dirty extent map in accordance with a preferred embodiment of the present invention. Primary storage 500 can be thought of as a contiguous storage area or address space 502. Address space 502 is divided into a number of blocks or extents, preferably of equal size. While the normal journaling process depicted in FIG. 4A is taking place, data management appliance 408 is continuously updated to reflect the current contents of primary storage 500. Once communication with data management appliance 400 is lost, however, write commands issued to primary storage 500 will result in discrepancies between primary storage 500 and data management appliance 408 representation of the latest contents of primary storage 500. As primary storage 500 is written to, some extents in address space 502 will be affected by the write, and others will not. Those extents that are affected by write commands issued to primary storage 500 after communication with data management appliance 408 is lost, are called dirty extents. To identify which extents are dirty and which extents are not dirty, a dirty extent map 508 is created and stored in a reserved space on primary storage 500. Dirty extent map 508, in a preferred embodiment, contains a bitmap 510 of the extents contained within address space 502. Preferably, a single bit within bitmap 510 represents a single extent within address space 502. For example, a dirty extent, such as dirty extent 506 (which is represented as dirty by shading), can be represented by the digit "1." Likewise, a "clean" extent, such as extent 504, can be represented by the digit "0."

In a preferred embodiment, the sizes of the extents making up address space 502 are large enough that dirty extent map 508 only takes up a modest amount of space on primary storage 500. For example, with a single bit representing a single extent, a one-hundred gigabyte address space divided into three-megabyte extents can be represented by a dirty extent map of just over four kilobytes. One of ordinary skill in the art will recognize that the extent sizes may be scaled to fit the application at hand.

Figure 6:
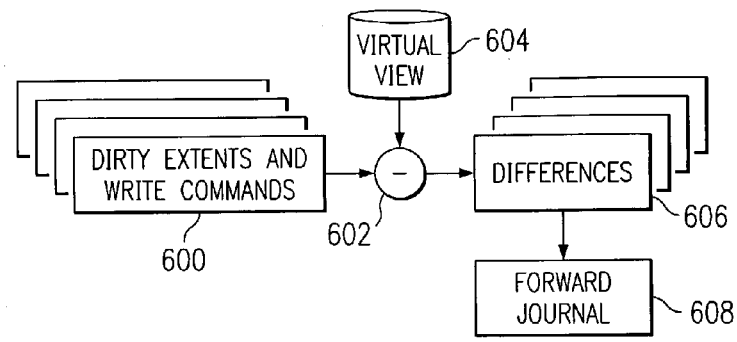
FIG. 6 is a diagram depicting a process of updating a data management appliance in accordance with a preferred embodiment of the present invention.

FIG. 6 is a diagram depicting a process of updating a data management appliance in accordance with a preferred embodiment of the present invention. FIG. 6 corresponds to the process taking place within data management appliance 408 in FIG. 4C. A set of write operations 600, including dirty extents copied from primary storage and write commands representing changes currently being made to primary storage, is compared (602) with virtual view 604, which is the latest replica of the primary storage that is stored on the data management appliance. This comparison (602) results in differences 606, which are written as new write commands in the data management appliance. In a preferred embodiment, differences 606 are written to a forward journal 608 for use in the "middle-in-the-middle" replication scheme, although other differences 606 may be written to other structures instead, such as a self-archiving log-structured volume, for instance.

Figure 7:
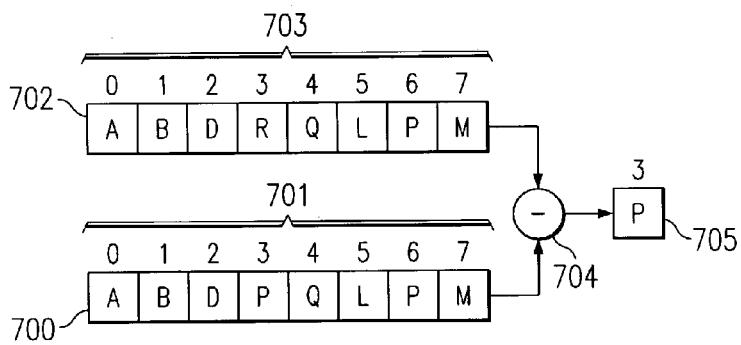
FIG. 7 illustrates a process of comparing dirty extents and write commands to a virtual view to obtain differences in accordance with a preferred embodiment of the present invention.

FIG. 7 illustrates a process of comparing dirty extents and write commands to a virtual view to obtain differences in accordance with a preferred embodiment of the present invention. Dirty extent 700 represents a block of data contained within a dirty extent in primary storage. Dirty extent 700 also contains some representation of an address range 701 represented by dirty extent 700. Virtual view block 702 represents the same addresses (703) as dirty extent 700, but virtual view block 702 contains data that comes not from the current contents of the primary storage, but rather from the virtual view representing the latest replica stored on the data management appliance (i.e., virtual view 604). Because dirty extent 700 and virtual view block 702 represent the same address range, they contain the same data except to the extent that the primary storage has changed since the latest virtual view was created. In FIG. 7, for instance, dirty extent 700 is identical to virtual view block 702 except in address 3, where the data has been changed. Computing a difference (704) between dirty extent 700 and virtual view block 702 involves identifying those addresses that have changed, and creating a difference that represents only the changes that were made. For example, difference 705 in FIG. 7 only contains a representation that address 3 has been changed on the primary storage to reflect the value "P." One of ordinary skill in the art will recognize that a wide variety of actual data formats may be used for representing virtual view blocks, dirty extents, new write commands, and differences, without departing from the scope and spirit of the present invention. FIG. 7 is intended only to illustrate on a conceptual level how such differences may be computed.

In an actual embodiment of the present invention, it is important that transition between the states depicted in FIGS. 4A–4C be performed as quickly as possible without losing continuity. In other words, for optimum fidelity and performance it is important that the transition between restoring or resynchronizing a data management appliance and the return of the data management appliance to normal operation be performed as smoothly as possible.

Figure 8A:
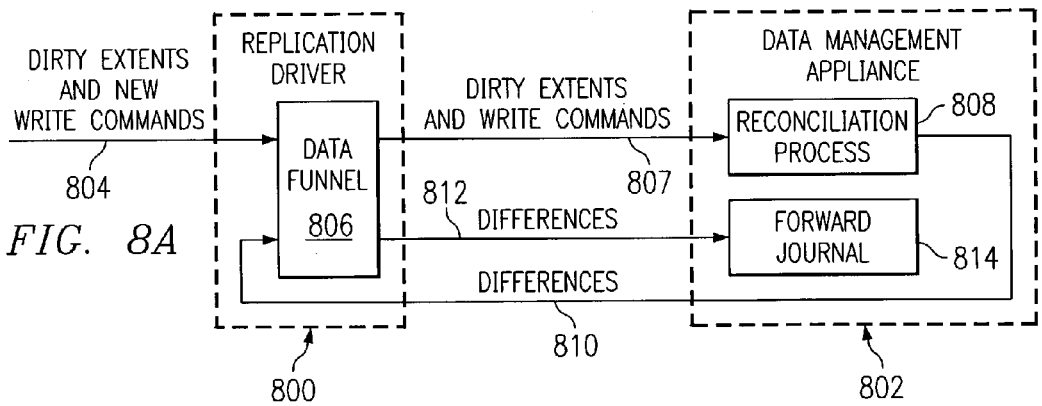
FIGS. 8A–8D depict a mechanism for making this transition in accordance with a preferred embodiment of the present invention.

FIGS. 8A–8D depict a mechanism for making this transition in accordance with a preferred embodiment of the present invention. FIG. 8A depicts a replication driver 800 in association with a data management appliance 802. In a preferred embodiment replication driver 800 is an item of software residing on data management appliance 802 associated with primary storage and data management appliance 802, which provides for replication of the data on the primary storage. One of ordinary skill in the art, however, will recognize that replication driver 800 may be implemented in hardware or software Replication driver 800 has the primary responsibility of accepting block data from the network driver, and writing those blocks to the forward journal. During reconciliation, the replication driver has the additional responsibility of writing incoming blocks from the host to the reconciliation journal, and writing blocks from the reconciliation process to the forward journal.

Returning to the example depicted in FIG. 8A, a process of restoring data management appliance 802 is shown. The process depicted in FIG. 8A roughly corresponds to that depicted in FIG. 4C. Dirty extents and new write commands 804, which are being written to data management appliance 802, are passed to data funnel 806. Data funnel 806 could be a hardware or software component, but its purpose is to act like a switch, directing the flow of data to appropriate recipients within data management appliance 802. While restoration of data management appliance 802 is taking place, dirty extents and new write commands 804 are forwarded (807) by data funnel 806 to reconciliation process 808 on data management appliance 802. Reconciliation process 808 corresponds to the process depicted in FIG. 6. In other words, reconciliation process 808 is the process by which dirty extents and write commands are compared with the latest virtual view on data management appliance 802 to produce differences 810. Differences 810 are fed into data funnel 806, which forwards the differences (812) to forward journal 814. One of ordinary skill in the art will recognize that reconciliation process 808 is effectively connected in a sort of loopback path to data funnel 806; information exiting reconciliation process 808 is fed back (or it "loops" back) to data funnel 806.

As can be seen, data funnel 806 reads streams of data from two different input sources. In a preferred embodiment, data funnel 806 is a portion of a software device driver that takes data in from two different software input/output interfaces. For example, replication driver 800 could be a POSIX device driver receiving data from both a write interface and an ioctl interface. One of ordinary skill in the art will recognize that the exact nature of data funnel 806 may vary depending on the hardware and system software making up the host computer system.

Figure 8B:
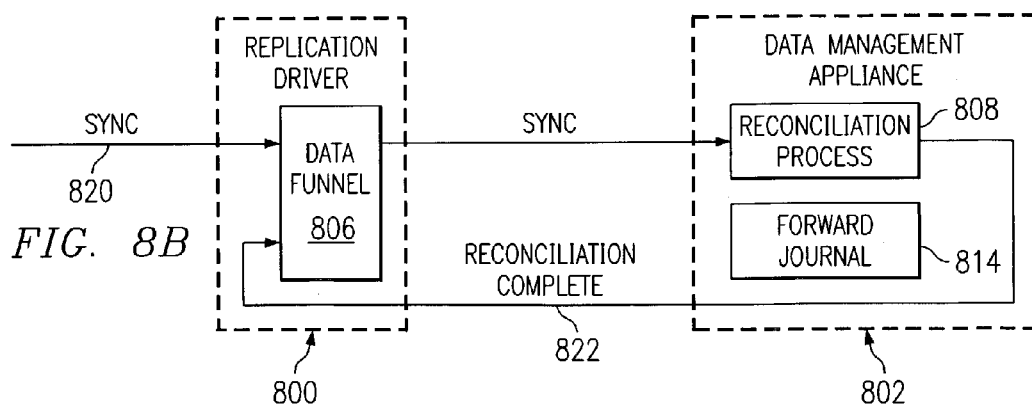

Turning now to FIG. 8B, once all dirty extents have been copied from primary storage and transmitted to data funnel 806, a synchronization signal 820 will be transmitted from the host computer system or primary storage device as part of dirty extents and new write commands 804. Synchronization signal 820 passes through data funnel 806 to reconciliation process 808, to apprise reconciliation process 808 of the fact that all subsequent writes being received by reconciliation process 808 are not dirty extents, but are new write commands. Once reconciliation process 808 has received synchronization signal 820 and once reconciliation process 808 has completed the computation of differences for all dirty extents and new write commands preceding and immediately following synchronization signal 820, reconciliation process 808 sends a signal 822 to data funnel 806 to signify that the reconciliation is complete. This causes data funnel 806 to change its state to that depicted in FIG. 8C.

Figure 8C:
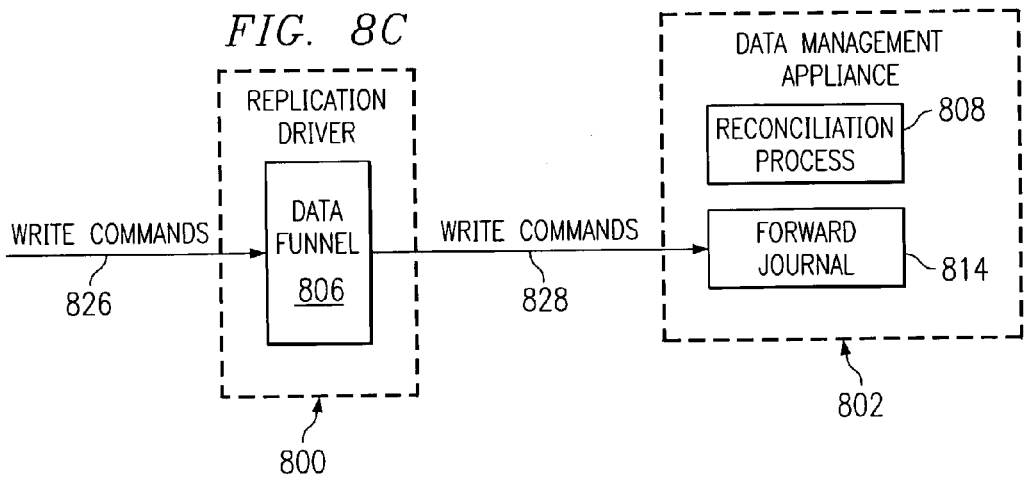

FIG. 8C represents the normal journaling mode, roughly corresponding to FIG. 4A. Write commands 826 pass through data funnel 806 and are written (828) directly to forward journal 814.

One of ordinary skill in the art will recognize that the switching action of data funnel 806 essentially serves to switch reconciliation process 808 (and whatever else may be connected in such a loopback path) in and out of a sequential datapath.

Figure 8D:
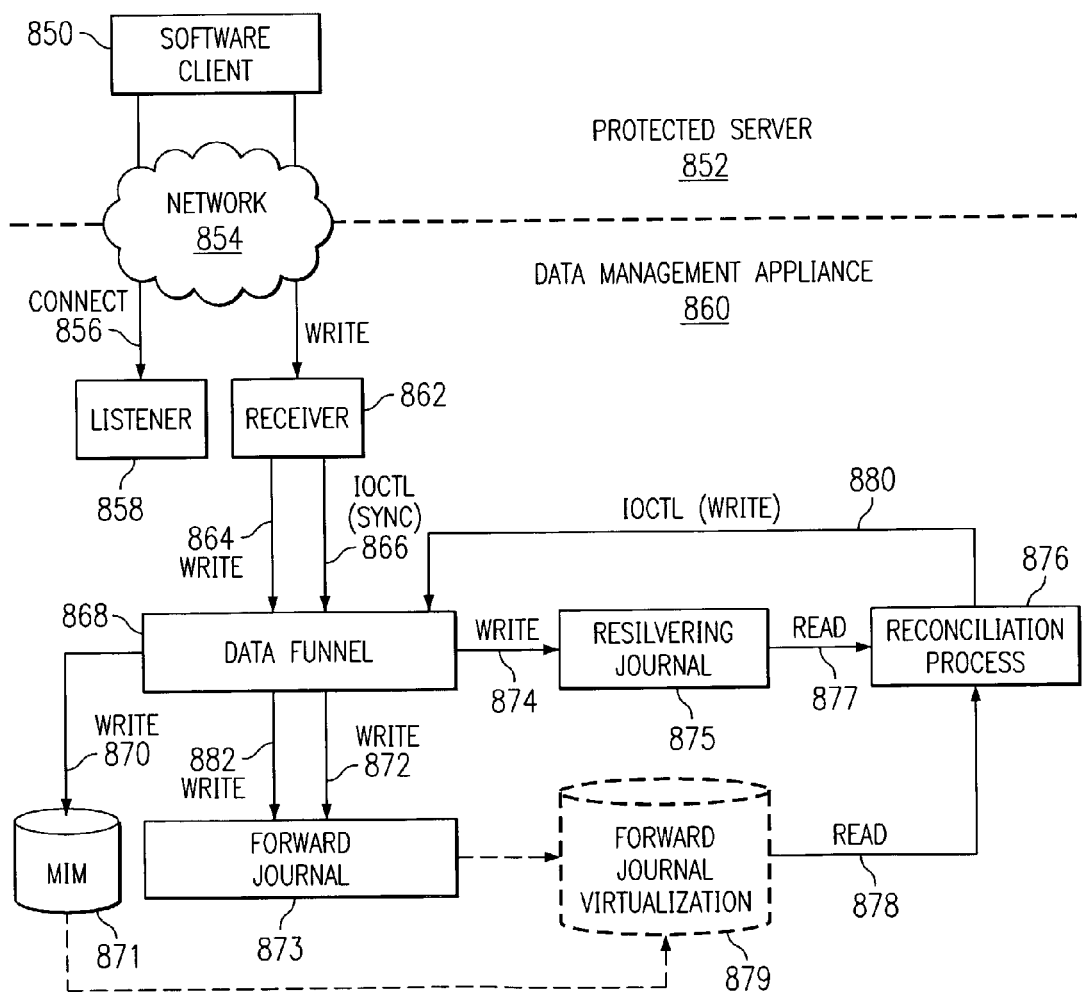

FIG. 8D is a detailed diagram depicting an overall view of the operation of a data funnel and its relation to other data management appliance components in a process of re-establishing a journaling process in accordance with a preferred embodiment of the present invention. A software client 850, residing on a protected server 852 is responsible for transmitting dirty extents and write commands to data management appliance 860. In the preferred embodiment depicted in FIG. 8D, such transmissions take place over a storage area network (SAN) or other form of network 854, although other communication means may substituted for network 854 without departing from the scope and spirit of the present invention.

Client 850 establishes requests a connection 856 with a listener process 858 residing on data management appliance 860. Listener process 858, in response to connection request 856, creates a receiver thread 862 (or alternatively, a receiver process) to process the request. To process the request, receiver thread 862 allocates a data funnel 868, resilvering journal 875, and reconciliation process 876.

Dirty extents and write commands are received by receiver thread 862 and passed through data funnel 868 via POSIX "write" I/O interface 864. Data funnel 868 directs the dirty extents and write commands to the correct destination based on the current state of the system. If journaling is being resumed, the dirty extents and write commands are written (arrow 874) to resilvering journal 875. If MIM 871 is being initially established, the dirty extents and write commands are written directly (arrow 870) to MIM 871. If data management appliance 860 is fully reconciled with protected server 852, then the dirty extents and write commands are written (arrow 872) to forward journal 873 as part of the usual journaling process.

Data funnel 868 receives a synchronization signal via a POSIX ioctl interface from receiver 862 to denote that all information necessary to re-establish the normal process of journaling has been sent to data management appliance 860. These sync signals are recorded in resilvering journal 875. In reconciling data management appliance 860 with protected server 852, reconciliation process 876 reads (arrow 877) dirty extents, write commands, and sync signals from resilvering journal 875.

To reconcile data management appliance 860 with protected server 852, reconciliation process 876 compares the data content of the dirty extents and write commands with a forward journal virtualization 879. Forward journal virtualization 879 is a best representation of the current state of the storage on protected server 852 derived from MIM 871 and forward journal 873. Forward journal virtualization 879 can be thought of as the "solution so far" in the process of reconciling data management appliance 860 with protected server 852. Comparing the dirty extents and write commands with forward journal virtualization 879 yields difference blocks, representing a difference between the actual data stored on protected server 852 and the "best so far" representation provided by forward journal virtualization 879. Reconciliation process 876 passes these difference blocks to data funnel 868 via a POSIX ioctl interface 880. Data funnel 868 then writes the difference blocks to forward journal 873.

When a sync signal is received by data funnel 868 from receiver thread 862 and written to resilvering journal 875, reconciliation process 876 reads the sync signal from resilvering journal 875. When this happens, reconciliation process 876 sends another sync signal back to data funnel 868 via ioctl interface 880, which prompts data funnel 868 to write (arrow 882) subsequently received write commands directly to forward journal 873. Subsequently, reconciliation process 876 consumes the entire contents of resilvering journal 875 to complete the reconciliation.

Figure 9A:
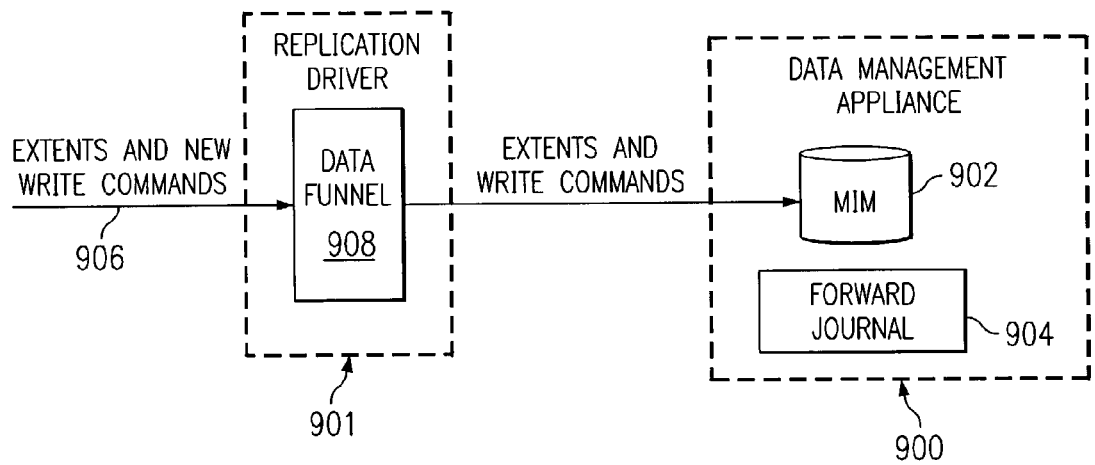
FIGS. 9A–9B depict a process of initially establishing a journaling process using a data management appliance using the Mirror-in-the-Middle replication scheme in accordance with a preferred embodiment of the present invention.
Figure 9B:
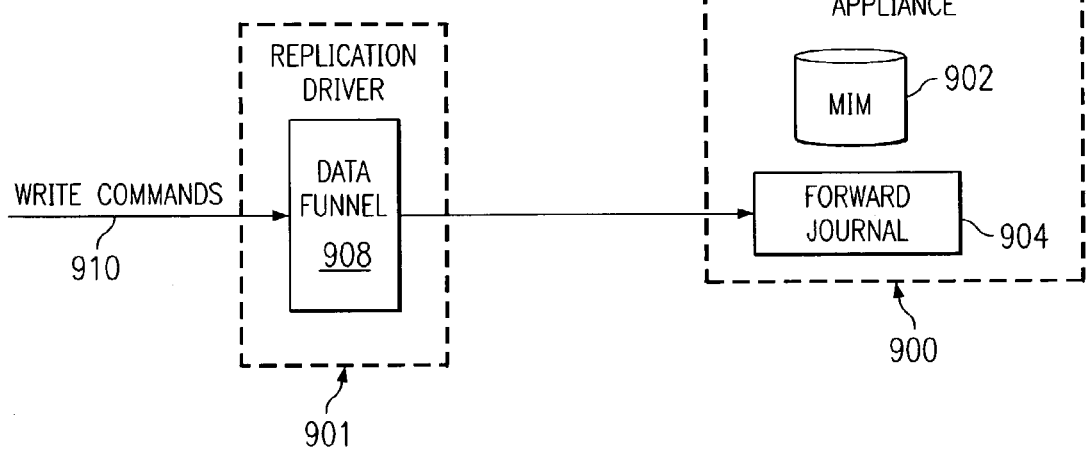

FIGS. 9A and 9B depict a special case of journaling restoration in accordance with a preferred embodiment of the present invention. Specifically, FIGS. 9A and 9B depict a process of initially establishing a journaling process using a data management appliance 900 using the Mirror-in-the-Middle replication scheme. One of ordinary skill in the art will recognize, that initially establishing the contents of a data management appliance is basically equivalent to restoring a data management appliance when all extents on the primary storage are dirty. In the mirror-in-the-middle replication scheme, the data management appliance 900 is initialized by copying the contents of the primary storage into mirror-in-the-middle 902. Thus, data management appliance 900 may be initialized by treating all extents on the primary storage as dirty, copying all of the extents on the primary storage and transmitting these extents to data management appliance 900, and directly writing the extents to mirror-in-the-middle 902, along with whatever new write commands may be issued to the primary storage. Hence, FIG. 9A shows extents and new write commands 906 being passed to data funnel 908, which, having been directed that mirror-in-the-middle 902 is being initially established, forwards extents and new write commands 906 to mirror-in-the-middle 902. Once all of the extents have been copied from the primary storage into mirror-in-the-middle 902, a synchronization signal may be issued, resulting in a change of state for data funnel 908 such that subsequent write commands 910 are forwarded by data funnel 908 into forward journal 904, as depicted in FIG. 9B.

It is important to note that while the present invention has been described in the context of a fully functioning data processing system, those of ordinary skill in the art will appreciate that the processes of the present invention are capable of being distributed in the form of a computer readable medium of instructions or other functional descriptive material and in a variety of other forms and that the present invention is equally applicable regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. Functional descriptive material is information that imparts functionality to a machine. Functional descriptive material includes, but is not limited to, computer programs, instructions, rules, facts, definitions of computable functions, objects, and data structures.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising:
   in response to a loss of communication with a secondary storage device, entering a first state;
   in response to resumption of communication with the secondary storage device, entering as second state;
   while in the first state, in response to data being written to an original extent on a primary storage device to form a modified extent, updating a dirty extent map to indicate that the extent has been written to;
   while in the second state, transferring to the secondary storage device contents of extents which the dirty extent map indicates have been written to;
   while in the second state, in response to having transferred to the secondary storage device contents of all extents which the dirty extent map indicates have been written to, entering a third state;
   while in the third state, relaying to the secondary storage device write commands issued to the primary storage device;
   while in the second state, relaying to the secondary storage device write commands issued to the primary storage device;
   wherein relaying, to the secondary storage device and while in the second state, write commands issued to the primary storage device includes relaying the write commands to a reconciliation process;
   utilizing said dirty extent map to identify modified extents that have been written to;
   executing said reconciliation process to reconcile said modified extent with said original extent for all identified modified extents until identified modified extents identified by said dirty extent map have been reconciled, said reconciliation process using said dirty extent map to identify extents that need to be reconciled; and
   in response to entering the third state, sending a synchronization signal to the secondary storage device, said synchronization signal being sent at the end of said reconciliation process.

2. The method of claim 1, wherein relaying, to the secondary storage device and while in the third state, write commands issued to the primary storage device includes relaying the write commands to a forward journal.

3. The method of claim 1, wherein the secondary storage device is a data management appliance.

4. A method comprising:
   receiving contents of at least one extent of data as existed on a primary storage device at a recent time, wherein the at least one original extent of data has been modified since a previous time to form a modified extent;
   determining from contents of a secondary storage device, contents of the at least one extent as existed on the primary storage device at the previous time;
   computing a first difference between contents of the at least one extent as existed on the primary storage device at the recent time and contents of the at least one extent as existed on the primary storage device at the previous time;
   updating the secondary storage device with the first difference;
   utilizing a dirty extent map to identify modified extents that have been modified;
   executing a reconciliation process to reconcile said modified extent with said original extent for all identified modified extents until all identified modified extents identified by said dirty extent map have been reconciled, said reconciliation process using said dirty extent map to identify extents that need to be reconciled; and
   sending a synchronization signal to the secondary storage device, said synchronization signal being sent at the end of said reconciliation process.

5. The method of claim 4, further comprising:
   receiving a command to write a block of data to a particular address range;
   determining from the contents of the secondary storage device, contents of the particular address range as existed on the primary storage device at the previous time;
   computing a second difference between contents of the block of data and contents of the particular address range as existed on the storage device at the previous time; and
   updating the secondary storage device with the second difference.

6. The method of claim 5, wherein updating the secondary storage device with the second difference includes writing the second difference to a forward journal.

7. The method of claim 5, wherein the secondary storage device includes a mirror-in-the-middle and the method further comprises:
   in response to a determination that the mirror-in-the-middle is being initialized, writing the second difference to the mirror-in-the-middle.

8. The method of claim 4, wherein updating the secondary storage device with the first difference includes writing the first difference to a forward journal.

9. The method of claim 4, wherein the secondary storage device is a data management appliance.

10. The method of claim 4, wherein the secondary storage device includes a mirror-in-the-middle.

11. The method of claim 10, further comprising:
    in response to a determination that the mirror-in-the-middle is being initialized, writing the first difference to the mirror-in-the-middle.

12. A computer program product in a computer readable medium comprising functional descriptive material that, when executed by a computer, enables the computer to perform acts including:
    in response to a loss of communication with a secondary storage device, entering a first state;
    in response to resumption of communication with the secondary storage device, entering a second state;
    while in the first state, in response to data being written to an original extent on a primary storage device to form a modified extent, updating a dirty extent map to indicate that the extent has been written to;
    while in the second state, transferring to the secondary storage device contents of extents which the dirty extent map indicates have been written to;
    while in the second state, in response to having transferred to the secondary storage device contents of all extents which the dirty extent map indicates have been written to, entering a third state;

while in the third state, relaying to the secondary storage device write commands issued to the primary storage device;

while in the second state, relaying to the secondary storage device write commands issued to the storage device;

wherein relaying, to the secondary storage device and while in the second state, write commands issued to the primary storage device includes relaying the write commands to a reconciliation process;

utilizing said dirty extent map to identify modified extents that have been written to;

executing said reconciliation process to reconcile said modified ent with said original extent for all identified modified extents until identified modified extents identified by said dirty extent map have been reconciled, said reconciliation process using said dirty extent map to identify extents that need to be reconciled; and in response to entering the third state, sending a synchronization signal to the secondary storage device, said synchronization signal being sent at the end of said reconciliation process.

13. The computer program product of claim 12, wherein relaying, to the secondary storage device and while in the third state, write commands issued to the primary storage device includes relaying the write commands to a forward journal.

14. The computer program product of claim 12, wherein the secondary storage device is a data management appliance.

15. A computer program product in a computer readable medium comprising functional descriptive material that, when executed by a computer, enables the computer to perform acts including:

receiving contents of at least one original extent of data as existed on a primary storage device at a recent time, wherein the at least one extent of data has been modified since a previous time to form a modified extent;

determining from contents of a secondary storage device, contents of the at least one extent as existed on the primary storage device at the previous time;

computing a difference between contents of the at least one extent as existed on the primary storage device at the recent time and contents of the at least one extent as existed on the primary storage device at the previous time;

updating the secondary storage device with the difference;

utilizing a dirty extent map to identify modified extents that have been written to;

executing said reconciliation process to reconcile said modified extent with said original extent for all identified modified extents until all identified modified extents identified by said dirty extent map have been reconciled, said reconciliation process using said dirty extent map to identify extents that need to be reconciled; and sending a synchronization signal to the secondary storage device, said synchronization signal being sent at the end of said reconciliation process.

16. The computer program product of claim 15, comprising additional functional descriptive material that, when executed by the computer, enables the computer to perform additional acts including:

receiving a command to write a block of data to a particular address range;

determining from the contents of the secondary storage device, contents of the particular address range as existed on the primary storage device at the previous time;

computing a second difference between contents of the block of data and contents of the particular address range as existed on the primary storage device at the previous time; and updating the secondary storage device with the second difference.

17. The computer program product of claim 16, wherein updating the secondary storage device with the second difference includes writing the second difference to a forward journal.

18. The computer program product of claim 16, wherein the secondary storage device includes a mirror-in-the-middle and the computer program product comprises additional functional descriptive material that, when executed by the computer, enables the computer to perform additional acts including:

in response to a determination the mirror-in-the-middle is being initialized, writing the second difference to the mirror-in-the-middle.

19. The computer program product of claim 15, wherein updating the secondary storage device with the difference includes writing the difference to a forward journal.

20. The computer program product of claim 15, wherein the secondary storage device is a data management appliance.

21. The computer program product of claim 15, wherein the secondary storage device includes a mirror-in-the-middle.

22. The computer program product of claim 21, comprising additional functional descriptive material that, when executed by the computer, enables the computer to perform additional acts including;

in response to a determination that the mirror-in-the-middle is being initialized, writing the difference to the mirror-in-the-middle.

23. A data process system for communicating with a primary storage device and a secondary storage device comprising:

a processing unit including at least one processor;

memory accessible by the processing unit;

a set of instructions within the memory;

a state variable storage location;

a primary storage interface adapted to operate in communication with the primary storage device and the processing unit; and a secondary storage interface adapter to operate in communication with the primary storage device and the processing unit, wherein the processing unit executes the set of instructions to perform acts including;

in response to a loss of communication with the secondary storage device, updating the state variable storage location to indicate that the data processing system is in a first state;

in response to resumption of communication with the secondary storage device, updating the state variable storage location to indicate that the data processing system is in a second state;

while the state variable storage location indicates that the data processing system is in the first state and in response to data being written to an original extent on the primary storage device to form an updated extent, updating a dirty extent map in the memory to indicate that the extent has been written to;

while the state variable storage location indicates that the data processing system is in the second state, transferring to the secondary storage device contents of extents which the dirty extent map indicates have been written to;

while the state variable storage location indicates that the data processing system is in the second state and in response to having transferred to the secondary storage device contents of all extents which the dirty extent map indicates have been written to, updating the state variable storage location to indicate that the data processing system is in a third state;

while the state variable storage location indicates that the data processing system is in the third state, relaying to the secondary storage device write commands issued to the primary storage device;

while the state variable storage location indicates that the data processing system is in the second state, relaying to the secondary storage device write commands issued to the primary storage device;

wherein relaying, to the secondary storage device and while in the second state, write commands issued to the primary storage device includes relaying the write commands to a reconciliation process;

said dirty extent map being utilized to identify modified extents that have been written to;

said reconciliation process being executed to reconcile said modified extent with said original extent for all identified modified extents until all identified modified extents identified by said dirty extent map have been reconciled, said reconciliation process using said dirty extent map to identify extents that need to be reconciled; and in response to entering the third state, a synchronization signal being sent to the secondary storage device, said synchronization signal being sent at the end of said reconciliation process.

24. The data processing system of claim 23, wherein relaying, to the secondary storage device and while in the third state, write commands issued to the primary storage device includes relaying the write commands to a forward journal.

25. The data processing system of claim 23, wherein the secondary storage device is a data management appliance.

26. The data processing system of claim 23, wherein the state variable storage location comprises at least a portion of a register of a processor within the processing unit.

27. The data processing system of claim 23, wherein state variable storage location comprises at least a portion of the memory.

28. A data management appliance comprising:

a random-access storage unit; and control circuitry adapted to receive commands from a host computer system, wherein the control circuitry performs acts including:

receiving contents of at least one extent of data as existed on a primary storage device at a recent time, wherein the at least one original extent of data has been modified since a previous time to form a modified extent;

determining from contents of the random-access storage unit, contents of the at least one extent as existed on the primary storage device at the previous time;

computing a difference between contents of the at least one extent as existed on the primary storage device at the recent time and contents of the at least one extent as existed on the primary storage device at the previous time;

updating the random-access storage unit with the difference;

utilizing a dirty extent map to identify modified extents that have been written to;

executing said reconciliation process to reconcile said modified extent with said original extent for all identified modified extents until all identified modified extents identified by said dirty extent map have been reconciled, said reconciliation process using said dirty extent map to identify extents that need to be reconciled; and sending a synchronization signal to the secondary storage device, said synchronization signal being sent at the end of said reconciliation process.

29. The data management appliance of claim 28, further comprising:

a temporary storage location, wherein the control circuitry performs additional acts including:

receiving a command to write a block of data to a particular address range;

determining from the contents of the random-access storage unit, contents of the particular address range as existed on the primary storage device at the previous time;

computing a second difference between contents of the block of data and contents of the particular address range as existed on the primary storage device at the previous time; and updating the random-access storage unit with the second difference.

30. The data management appliance of claim 28, wherein updating the random-access storage unit with the second difference includes writing the second difference to a forward journal.

31. The data management appliance of claim 28, wherein the random-access storage unit includes a mirror-in-the-middle and the control circuitry performs additional acts including:

in response to a determination that the mirror-in-the-middle is being initialized, writing the second difference to the mirror-in-the-middle.

32. The data management appliance of claim 28, wherein updating the random-access storage unit with the difference includes wring the difference to a forward journal on the random-access storage unit.

33. The data management appliance of claim 28, further comprising:

a mirror-in-the-middle on the random-access storage unit.

34. The data management appliance of claim 33, further comprising:

in response to a determination that the mirror-in-the-middle is being initialized, writing the difference to the mirror-in-the-middle.

* * * * *